April 7, 1970 G. PILLONS ET AL 3,504,881
VEHICLE SEAT SUSPENSION SYSTEMS
Filed Jan. 10, 1968 2 Sheets-Sheet 1

Inventors:
Georges Pillons
Denise Aspa
By: Ernest G. Montague
Attorney

April 7, 1970  G. PILLONS ET AL  3,504,881
VEHICLE SEAT SUSPENSION SYSTEMS
Filed Jan. 10, 1968  2 Sheets-Sheet 2
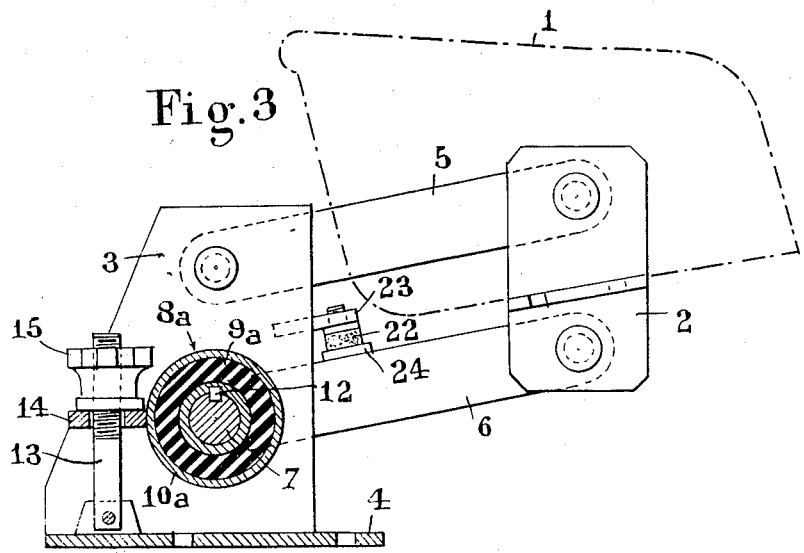
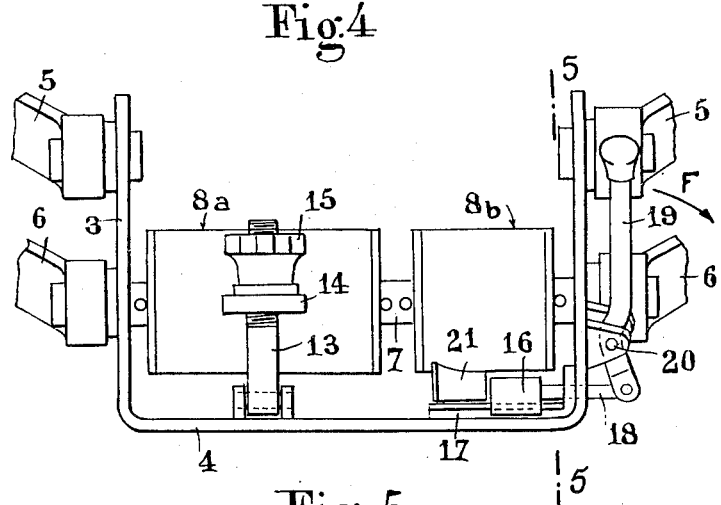
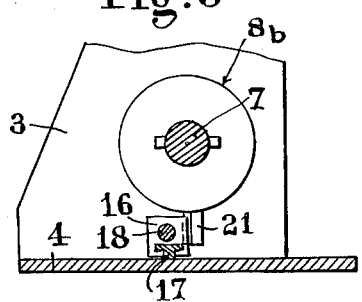
Inventors:
Georges Pillons
Denise Aspa
By: Ernest G. Montague
Attorney United States Patent Office 3,504,881
Patented Apr. 7, 1970

3,504,881
VEHICLE SEAT SUSPENSION SYSTEMS
Georges Pillons, 21 Boulevard de Montmorency, and Denise Aspa, 52 Rue de Prony, both of Paris, France
Filed Jan. 10, 1968, Ser. No. 696,947
Claims priority, application France, Oct. 12, 1967, 124,167
Int. Cl. B60m 1/00
U.S. Cl. 248—399                    4 Claims

ABSTRACT OF THE DISCLOSURE

An elastic suspension system for a seat of automotive vehicles, which comprises in combination a fixed bracket, a shaft rotatably mounted on the fixed bracket and at least one link supporting the seat with one end and having its other end rigid with the rotary shaft. A first resilient element of tubular configuration is disposed on the rotary shaft, the element comprising a relatively thick-walled elastic tubular member adhering on the one hand to an inner socket rigid with the rotary shaft and on the other hand to an outer socket, connecting means disposed between the outer socket of the first resilient element and the fixed bracket, and another resilient element also of tubular configuration and disposed on the rotary shaft. The other resilient element comprises a relatively thick-walled elastic tubular member adhering on the one hand to a second inner socket and on the other hand to a second outer socket, a first series of connecting means between the inner socket of the other resilient element and the rotary shaft, and another series of connecting means between the outer socket of the other resilient element and the fixed bracket, at least one of the two series of connecting means comprising at least one coupling member adapted to ensure the selective releasable corresponding operative connection of the other resilient element between the fixed bracket and the rotary shaft, each of the resilient elements being complete, integral uniting members independently operative of the other.

---

This invention relates to elastic suspension systems adapted to equip the seats of certain unsprung vehicles, or vehicles having a suspension system too stiff to afford a sufficient comfort to the users. This is observed notably in certain trucks, public works machines and more particularly farming tractors.

A number of suspenesion systems are already known which are specially designed for these specific applications. As a rule, they comprise adjustment means having necessarily a limited range and of which the only function is to adjust the suspension systems according to the weight of the user of the corresponding seat. However, the adjustment means thus provided are not capable of adapting the seat suspension to different driving, working or service conditions.

Some of the above-mentioned vehicles, notably farming tractors and certain earth moving machines have no suspension system whatsoever and on the other hand they are frequently operated under widely varying conditions. Thus, during the long periods in which a farming tractor is operated off the road or in the fields, therefore at low speed, some kind of suspension would be welcome in order to protect the driver against considerable but non-periodic vertical shocks. Under these conditions, a suspension system having a sufficient elasticity is necessary, but its action must in all cases be gradual and remain within given limits, otherwise serious inconveniences are likely to arise, such as sudden changes in the driver's position which may prevent him from reaching the control pedals or, in contrast thereto, a too severe limitation of the movements of the movable components of the seat suspension would cause the seat to strike the bottom and cause a severe discomfort to the driver.

Besides, when driving the same tractor on more or less smooth roads, the driver should preferably benefit from a very flexible suspension providing a very low oscillation frequency well below the inherent frequency of the tractor, so that the driver is protected from the engine vibration and from the sustained vibration caused by unevenness of the road.

In view of the foregoing it is an object of the present invention to provide a suspension system for vehicle seats, which permits its instantaneous adaptation to widely differing working and service conditions.

It is another object of the present invention to provide a seat suspension comprising in combination at least two resilient elements of which one is adapted constantly to connect the seat to a fixed bracket or like frame structure, the other element being so mounted that it can be interposed manually at will between the seat and the fixed bracket in order to stiffen the suspension when necessary, with the assistance of a clutch or like device, whereby the second resilient element can be rendered operative or inoperative at will independent of the first resilient member, both members constituting complete, unitary structures.

The first resilient element providing a permanent linkage between the seat and the fixed bracket is adapted to provide the maximum elasticity in order to obtain low frequency when the vehicle on which the seat is mounted is to be driven on ordinary roads. Preferably, the first resilient element comprises adjustment means providing a limited range of adjustment, mainly for the purpose of adaptating the seat to the weight of its occupant at the moment.

The other resilient element incorporated in the seat suspension of this invention is adapted to be rendered operative when it is desired to stiffen the suspension system, for example, for driving the vehicle off the road. In fact, in this case, the action of this second resilient element is combined with that of the first element.

In a specific form of embodiment of the seat suspension system according to this invention the seat proper is connected to the fixed bracket or frame structure of the vehicle by means of two pairs of links constituting a parallel-motion system, and also the pair of resilient elements comprising for example rings of elastic material adapted to withstand shearing and torsion stresses, and receiving therethrough a shaft rigidly connected with two of the links. These rings surround a coaxial metal socket also rigidly connected with the shaft.

On the other hand, a socket disposed externally of one of the resilient elements is rigidly connected with the fixed bracket or frame structure, preferably by an adjustable connecting and anchoring member, the outer socket of the other resilient element being anchored to the fixed bracket or frame structure by means of a clutch or like device.

With these and other objects in view, which will become apparent in the following detailed description, the present invention will be clearly understood in connection with the accompanying drawings, in which:

FIG. 3 is a vertical section along the lines 3—3 of FIG. 2;

FIG. 4 is an elevational view showing the rear end of the suspension system; and FIG. 5 is a fragmentary section along the lines 5—5 of FIG. 4.

Figure 1:
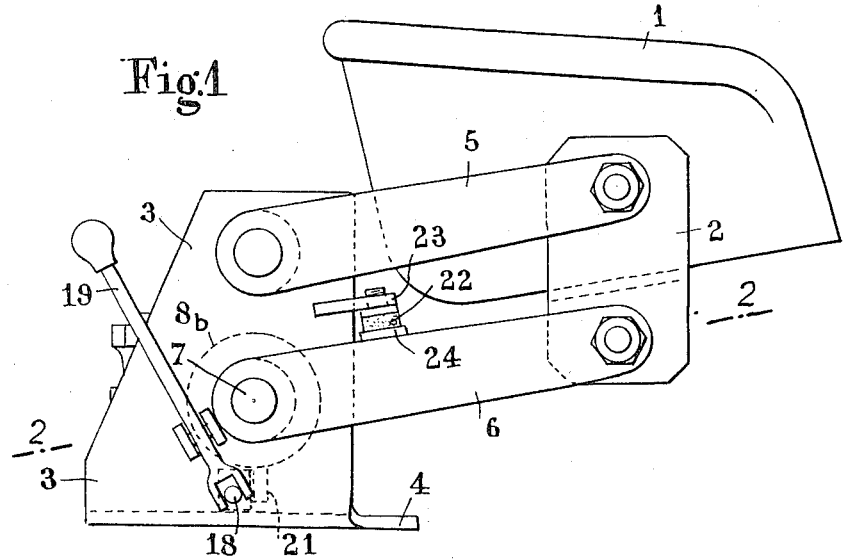
FIG. 1 is a side elevational view showing a seat equipped with the suspension system of the present invention.
Figure 2:
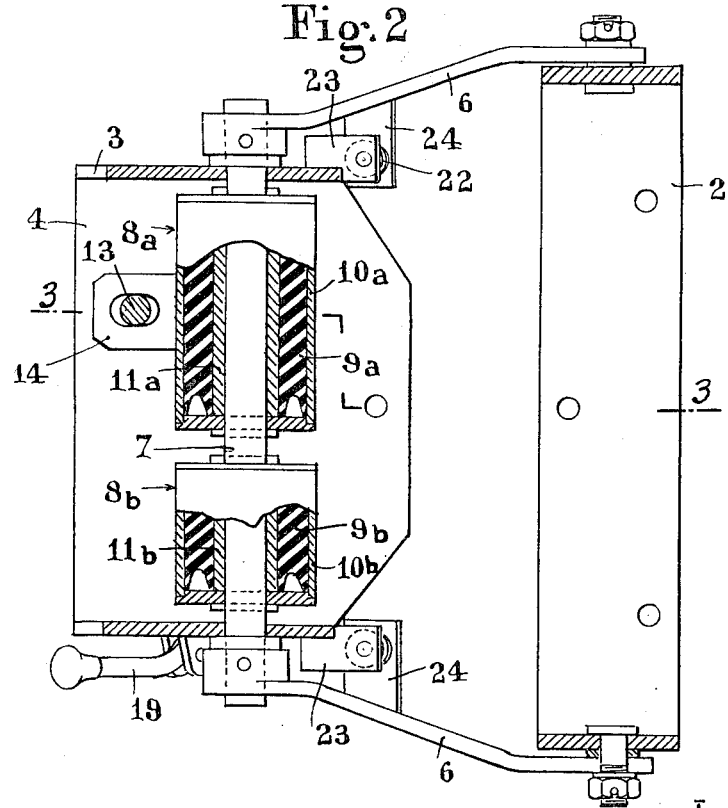
FIG. 2 is a section along the lines 2—2 of FIG. 1.

In the example illustrated in the drawings a vehicle seat 1 equipped with a suspension system according to the present invention is secured to a support 2 connected in turn to the vertical flanges 3 of a substantiallyU-shaped fixed bracket 4 by means of two pairs of links 5 and 6 forming a parallel-motion system. Thus, the seat is movable parallel to its initial position, without changing the driver's or passenger's position, as a consequence of the load or of shocks.

At their rear ends, two of these links, in this example the lower one 6, are rigidly connected to a horizontal shaft 7 extending through the flanges 3 of the fixed bracket 4 and adapted to rotate freely in the flanges.

Surrounding the shaft 7 is a first resilient element 8a in the form of a thick-walled tubular member of elastic material constituting the suspension device of this invention, in combination with another similar element 8b also surrounding the shaft 7.

Each one of these resilient elements consists of a ring 9a or 9b, respectively, of rubber or other suitable elastomer, adhering on the one hand to an external socket 10a or 10b, respectively, and on the other hand to an internal socket 11a or 11b, respectively, for example by means of a special cementing operation.

The inner socket of each resilient element is rigidly connected with the shaft 7, for example by providing a key 12 therebetween as shown in FIG. 3. Thus, the two resilient elements are constantly connected by means of their inner sockets to a movable member associated with the seat, namely the rotary shaft 7.

Besides, the outer socket 10a of the first resilient element 8a is rigidly connected to the fixed bracket 4 by means of adjustment means permitting of adjusting the initial position of the seat as a function of the user's weight. This system consists of a screw-threaded rod 13 having one end pivotally connected to the fixed bracket and the other end engaged in a lug 14 carried by the outer socket 10a of the first resilient element, an adjustment nut 15 being carried by this other end.

Thus, the first resilient element 8a will provide a constant elastic connection between the fixed bracket 4 and the axis of rotation of the seat-suporting links 6.

However, the mounting of the other resilient element 8b differs from the above-described arrangement in that its outer socket 10b is not constantly rigidly connected with the fixed bracket 4. In fact, this socket 10b may be rendered rigidly connected with the bracket 4 by means of a clutch or any other similar device capable of rendering this other resilient element operative or inoperative, at will.

Referring now again to the drawing, and more particularly to FIGS. 4 and 5, this clutch or like device may consist, for example, of a movable bolt 16 slidably mounted on a guide rail 17 carried by the fixed bracket 4, the bolt 16 being rigidly connected with a control rod 18 adapted to be moved in its axial direction by means of a control lever 19 disposed on one side of the bracket 4, externally of the corresponding flange 3, and adapted to pivot in the direction of the arrow F (FIG. 4) about a pivot pin 20.

The outer socket 10b of the second resilient element 8b carries a lug 21 adapted to co-act with the movable bolt 16.

In the position illustrated in FIG. 4 the bolt 16 is out of registry with the lug 21 so that the outer socket 10b of the other resilient element 9b is free with respect to the fixed bracket 4. Under these conditions this element 9b can rotate freely with the shaft 7 without producing any reaction and without playing any part in the suspension system. Therefore, only the first resilient element 8a is operative in the suspension system.

Besides, the characteristics of the resilient ring or tubular body 9a constituting this first element are designed such that the suspension is extremely flexible and suitable for driving the vehicle on any ordinary roads.

The shape of this resilient element is designed with a view to apply a uniform load to the different portions thereof, whereby the thick-walled elastic tubular member thereof, subjected to shearing stress permits, under considerable loads, angular movements of relatively great amplitude capable on the one hand to damp out shocks and on the othed, due to the specific hysteresis of the elastomer constituting this tubular member, to quickly control sustained oscillations.

As already explained hereinabove the other resilient element 8b is adapted to increase considerably the stiffness of the seat suspension when required, for example, if the vehicle is to be driven off the road. Preferably, the elastic tubular member 9b of the second element has a lower flexibility than the tubular member 9a of the first element.

To render this other element operative, the user simply moves the lever 19 in the direction of the arrow F (FIG. 4) so as to bring the movable lock bolt 16 in front of the lug 21 carried by the outer socket 10b of this element.

Thus, this outer socket is rigidly connected to the fixed bracket 4 and therefore to the vehicle structure, whereby this other element will now become operative in the suspension system since its inner socket 11a is already rigidly connected with the rotary shaft 7. Consequently, the elastic resistance of the tubular member 9a of this second element is added to that of the first element.

Due to this particular arrangement, the suspension system according to the present invention can be adapted to widely varying conditions of operation of the vehicle on which the system is mounted. This advantageous feature is particularly valuable in the case of vehicles such as farming tractors and public works machines, but it will be readily understood that the present invention is applicable to many other vehicles and uses.

Preferably, the suspension system of the present invention comprises, in addition to the pair of resilient elements 8a and 8b, one or more elastic stops adapted to limit rebound or upward movements of the movable seat 1, in order to afford a rapid control of the oscillation thereof. These stops may consist, for example, of elastic pads 22 secured to supports 23 rigidly connected with the lateral flanges 3 of the fixed bracket 4, and registering with lugs 24 carried by the lower links 6. The arrangement is such that these lugs bear against the pads 22 when the seat moves upwards.

The adjustment of the initial tension of the first resilient element of the suspension device, which is always operative, should be so accomplished that these two pads 22 be only slightly compressed by the engagement of lugs 24 therewith when the user is normally seated on the seat 1.

Thus, in case of a sudden shock received by the vehicle the distortion of resilient element 8a or possibly of resilient elements 8a and 8b, if both are operative at the time considered, takes place without strain when the seat moves downwardly.

But during the return movement or when the seat moves upwardly the lugs 24 engage the elastic pads 22 with force, thus compressing these pads. Therefore, the pads 22 will limit the upward movement of the seat but in a gradual manner due to their elasticity. Thus, the seat oscillations are damped out rapidly and smoothly.

This system may comprise, for example, more than two resilient elements 8a, 8b, for example, three or four, in order to afford different adjustment possibilities.

In this case, one of these elements will be constantly interposed between the fixed bracket 4 and the movable member associated with the seat, so as to operate permanently.

One or more clutches or like devices will be provided in this case to permit the operation of one or more of the remaining resilient elements, or the whole of these elements, when necessary.

Besides, the clutch device illustrated in the attached drawings may be replaced by any other device or system capable of performing the same function.

Possibly, the second resilient element may be rendered operative by using an arrangement constituting the reverse of the one proposed herein. In other words, the outer socket 10b may be constantly connected to the fixed bracket 4, and the inner socket of the same element may be free in relation to the shaft 7 but adapted to be locked against rotation in relation thereto by means of a clutch or any other suitable mechanism or device.

Moreover, the method of mounting the two resilient elements may be changed or altered, and the seat-supports links may be replaced by any other suitable supporting members or devices in accordance with the present invention.

Finally, in certain cases it may be advantageous to provide upper links 5 shorter, or on the contrary longer, than the lower links 6, and in this case the assembly will constitute on either side a pivoted quadrilateral.

While we have disclosed one embodiment of the present invention, it is to be understood that this embodiment is given by example only and not in a limiting sense.

What we claim is:

1. An elastic suspension system for a seat of automotive vehicles, which comprises in combination
   a fixed bracket,
   a rotary shaft mounted on said fixed bracket,
   at least one link adopted to support said seat with one end having its other end rigidly connected with said rotary shaft,
   a first resilient element of tubular configuration engagingly surrounding at least a part of said rotary shaft,
   said element comprising a first inner socket and a first outer socket and a first relatively thick-walled elastic tubular member adhering on the one hand to said first inner socket, the latter rigidly connected with said rotary shaft and on the other hand to said first outer socket,
   connecting means disposed between said first outer socket of said first resilient element and said fixed bracket providing a constant operative connection of said first resilient element between said fixed bracket and said rotary shaft,
   another resilient element of tubular configuration and engagingly surrounding portion of said rotary shaft,
   said another resilient element comprising a second inner socket and a second outer socket and a second relatively thick-walled elastic tubular member adhering on the one hand to said second inner socket and on the other hand to said second outer socket,
   a first series of connecting means directly between said second inner socket of said another resilient element and said rotary shaft,
   a second series of connecting means between said second outer socket of said another resilient element and said fixed bracket,
   at least one of said first and second series of connecting means comprising at least one manually operable coupling member means for releasably connecting and disconnecting selectively, said another resilient element from operative connection, independent of said first resilient element, directly between said fixed bracket and said rotary shaft, and
   each of said first resilient element and said another resilient element constituting complete integral unitary members.

2. The seat suspension system, as set forth in claim 1, wherein
   said tubular member of elastic material of said first resilient element which provides via said connecting means said constant connection between said rotary shaft and said fixed bracket is made of a material which is more flexible than that of said tubular member of elastic material of said another element.

3. The seat suspension system, as set forth in claim 1, further comprising
   a seat operatively connected to said rotary shaft mounted on said fixed bracket,
   said at least one link comprising two pairs of links constituting a pair of parallel-motion devices secured to said rotary shaft on the one hand and operatively connected to said seat on the other hand,
   said first and second inner sockets of said first and said another resilient elements, respectively, and disposed on said rotary shaft are rigidly connected therewith, and
   said second outer socket of said another resilient element is connected to said fixed bracket by said at least one manually operable coupling member means to ensure the corresponding connection and disconnection, respectively, of said another resilient element independent of said first resilient element from operative connection directly between said fixed bracket and said rotary shaft.

4. The seat suspension system, as set forth in claim 3, wherein
   said at least one manually operative coupling member means between said fixed bracket and said second outer socket of said another resilient element comprises,
   a bolt held to and movable on, selectively, said fixed bracket,
   a member projecting from said second outer socket and adapted to cooperate with said bolt when said bolt is moved to operative position adjacent said projecting member, and
   manual control means operatively connected to said bolt for moving said bolt to and from, selectively, said operative position in which it cooperates with said projecting member for operatively connecting said another resilient element directly between said fixed bracket and said rotary shaft and an inoperative position in which it is retracted with respect thereto.

References Cited

UNITED STATES PATENTS

| 2,167,508 | 7/1939 | Herold | 248—374 |
| 2,477,187 | 7/1949 | Lanchner | 267—57.1 |
| 2,590,711 | 3/1952 | Krotz | 267—57.1 |
| 2,652,880 | 9/1953 | Gundersen | 248—399 |
| 2,682,295 | 6/1954 | Hickman | 248—399 |
| 2,915,306 | 12/1959 | Hickman | 267—57.1 |
| 3,178,148 | 4/1965 | Manke | 248—399 |
| 3,268,200 | 8/1966 | Eicher | 248—399 |

FRANCIS K. ZAGEL, Primary Examiner

U.S. Cl. X.R.
248—374; 297—307